Oct. 12, 1965
A. A. ROOD
3,211,411
VEHICLE SEAT
Filed March 19, 1964
3 Sheets-Sheet 1
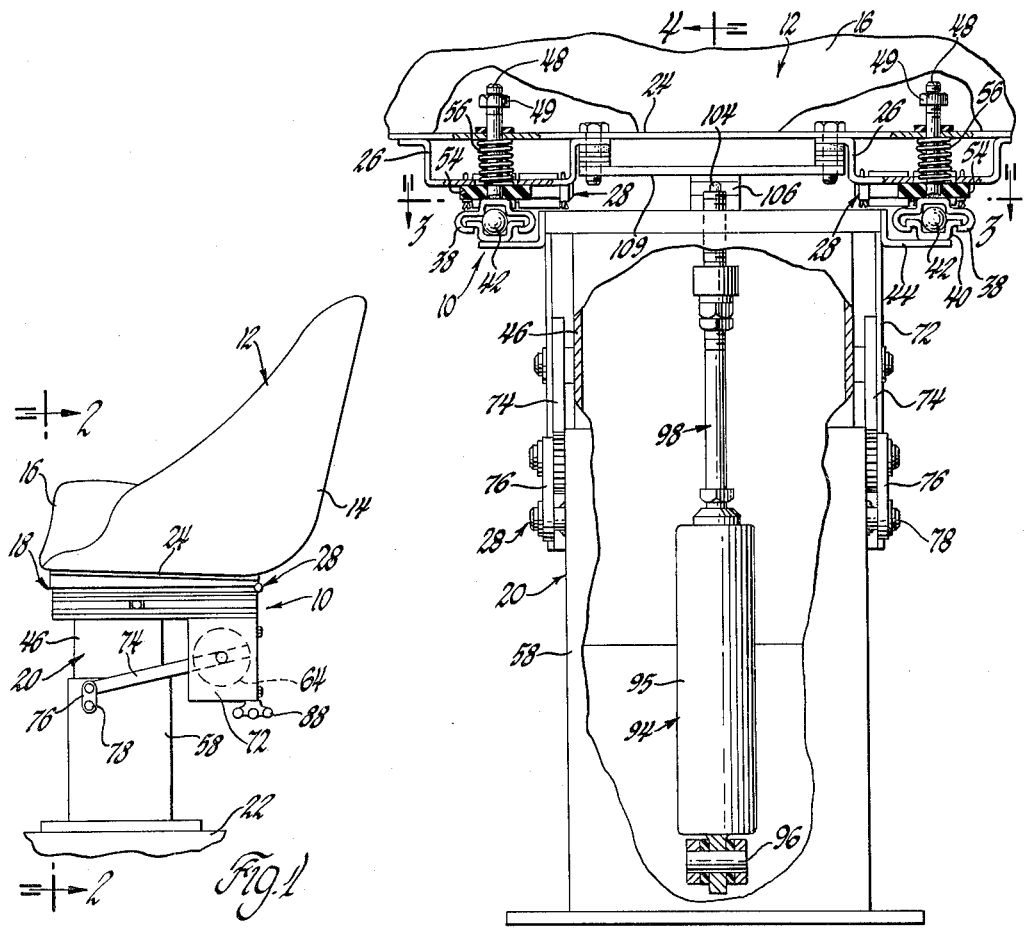
Fig.1
Fig.2
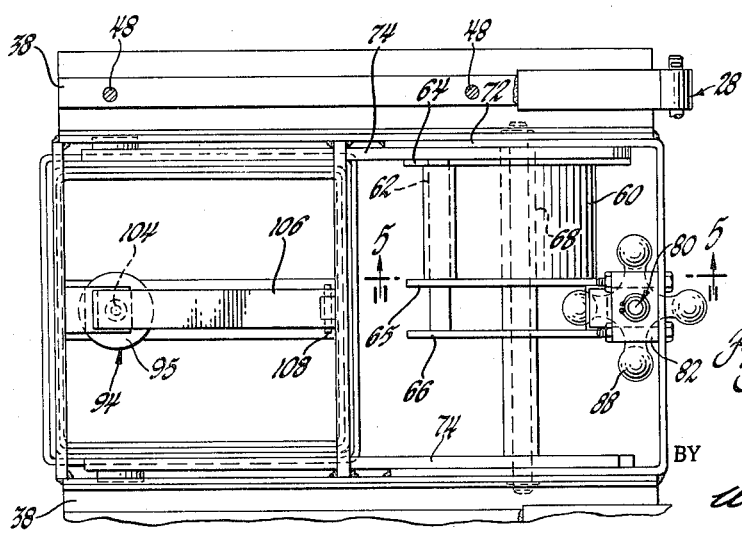
Fig.3
INVENTOR.
Alvin A. Rood
BY
W. F. Wagner
ATTORNEY Oct. 12, 1965          A. A. ROOD           3,211,411
                       VEHICLE SEAT
Filed March 19, 1964                     3 Sheets-Sheet 2

INVENTOR.
Alvin A. Rood
BY
W. F. Wagner
ATTORNEY

INVENTOR.
Alvin A. Rood
BY
W. F. Wagner
ATTORNEY

United States Patent Office 3,211,411
Patented Oct. 12, 1965

3,211,411
VEHICLE SEAT
Alvin A. Rood, Willoughby, Ohio, assignor to General Motors Corporation, Detroit, Mich., a corporation of Delaware
Filed Mar. 19, 1964, Ser. No. 353,097
8 Claims. (Cl. 248—399)

This invention concerns a seat assembly for an off-highway vehicle and more particularly an improved seat suspension system that automatically varies the damping effect of an associated shock absorber in accordance with the load on the seat.

The typical seat suspension for an off-highway vehicle seat is designed so that the amplitude of vibration of the seat is controlled by a shock absorber to provide a relatively smooth ride for the driver. However, in instances where severe road conditions have been encountered, the damping characteristics of the shock absorber and the manner the latter is incorporated in the seat suspension have been such that at times the seat spring is prevented from maintaining the seat with the driver. As a result, the driver frequently becomes weightless in the seat and experiences severe jarring whenever his body and the seat make full contact.

This invention contemplates a seat suspension assembly which alleviates the above-mentioned problem by employing a shock absorber having high and low damping characteristics so that whenever the driver becomes weightless in the seat the damping effect of the shock absorber is decreased and the spring portion of the suspension assembly is allowed to maintain the seat with the driver. This is accomplished in accordance with the invention by a seat assembly comprising a seat which is resiliently supported on a base through a suspension assembly. Means are provided for connecting the seat to the suspension assembly for independent movement relative to the latter between two vertically-spaced positions. A dual range damping shock absorber is provided in the suspension assembly and operatively connected to the seat so that in one of the seat positions the shock absorber experiences high damping characteristics while in the other position the shock absorber has low damping characteristics.

Figure 4:
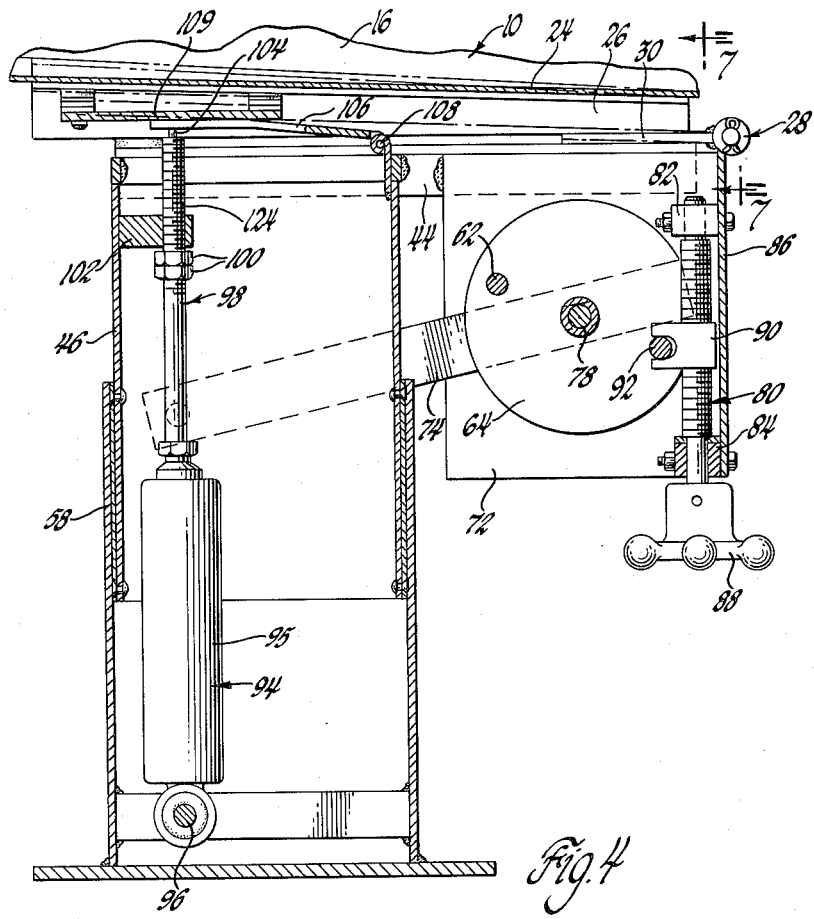
Figure 5:
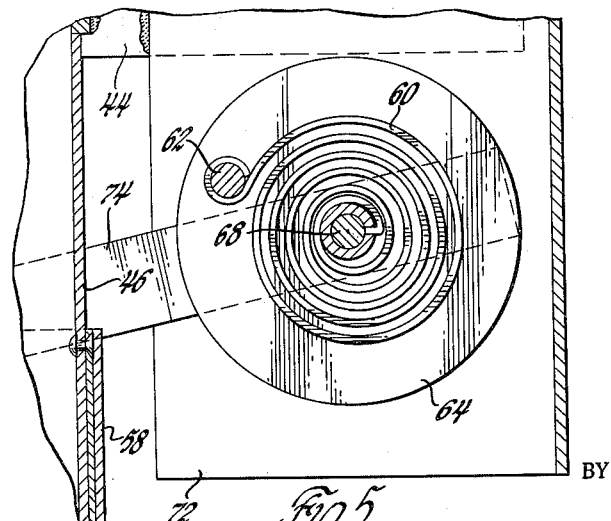
Figure 6:
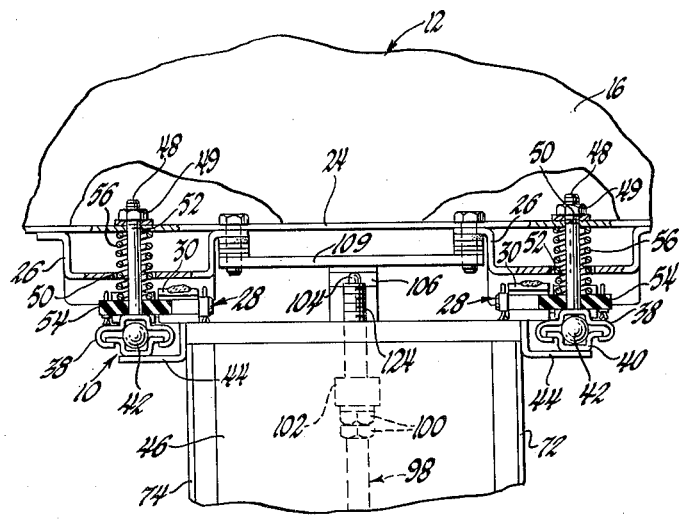
Figure 7:
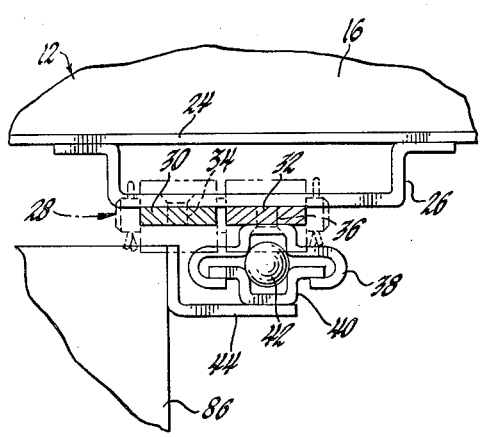
Figure 8:
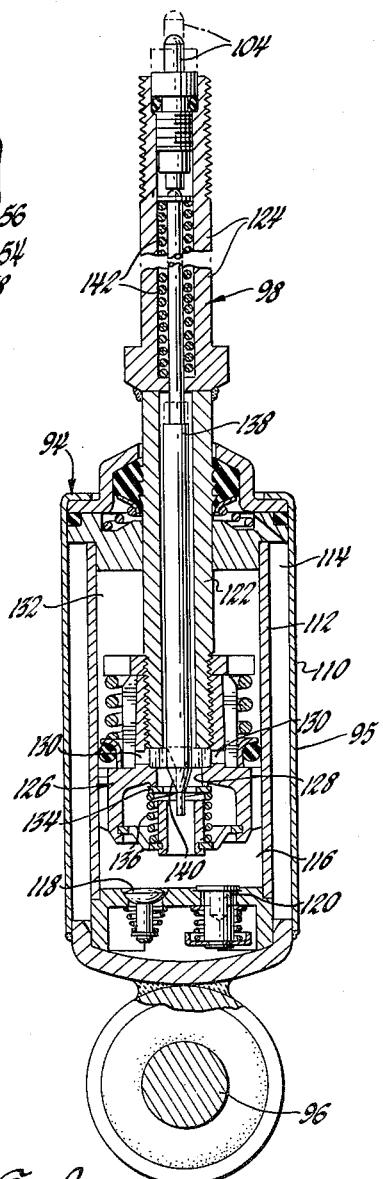

A more complete understanding of the invention will be derived from the following detailed description when taken in conjunction with the drawings in which:

FIGURE 1 is a side elevational view of a vehicle seat made in accordance with the invention, FIGURE 2 is an enlarged fragmentary view partly in section taken along lines 2—2 of FIGURE 1, FIGURE 3 is a view taken along lones 3—3 of FIGURE 2, FIGURE 4 is a sectional view taken along lines 4—4 of FIGURE 2, FIGURE 5 is an enlarged view showing the torsion spring employed with the vehicle seat shown in FIGURES 1-4, FIGURE 6 is a fragmentary view of a portion of the seat construction and illustrates one of the positions which the seat portion can assume relative to the seat support member, FIGURE 7 is an enlarged fragmentary view partly in section taken along lines 7—7 of FIGURE 4, and FIGURE 8 is an enlarged sectional view showing the details of the shock-absorbing device incorporated with the vehicle seat of FIGURE 1.

Referring now to FIGURE 1 of the drawing, a vehicle seat assembly 10 is shown comprising a seat 12 having a back-rest portion 14 and a cushion portion 16 pivotally mounted on a seat support assembly 18 which, in turn, is connected through a suspension assembly 20 to the vehicle floor 22.

More specifically, the cushion portion 16 is rigidly attached to a support plate 24 which fixedly carries a pair of laterally spaced elongated channel members 26 positioned in parallel relationship and extending from the front to the read end of the seat 12. At the rear of each channel member 26, a flap type hinge 28 having a pair of straps 30 and 32 is provided for pivotally connecting the rear of seat 12 to the seat support assembly 18. In this regard reference is made to FIGURE 7, which discloses the manner of such connection. It can be seen in this figure that the straps 30 and 32 of the hinge 28 are respectively secured by screws 34 and 36 to the channel member 26 and a rail member 38 which is one component of the seat support assembly 18. It should be noted that the rail member 38 is carried by a channel rail member 40 through a plurality of ball bearings 42 located between the respective members. Moreover, the channel rail member 40 rests upon and is rigid with an angle iron 44 secured to the outer surface of an upper cylinder member 46 and extending rearwardly therefrom.

The front end of each channel member 26 is connected to the forward portion of the associated rail member 38 in a manner that permits the front end of the seat to move in a vertical direction relative to the upper cylinder member 46 between two extreme positions. In this connection, it should be noted that an upstanding stud 48 is fixed to the upper surface of each rail member 38 and has the free end provided with a nut 49 which acts as a stop for limiting upward movement as seen in FIGURE 6. The stud 48 passes through apertures 50 and 52, respectively, provided in the channel member 26 and support plate 24 and, in addition, supports a rubber pad 54 located between the rail member 30 and the channel member 26. Furthermore, a coil spring 56 encircles the stud 48 and has one end resting on the pad 54 while the other engages the underside of the support plate. The coil spring 56 serves to continuously urge the seat upwardly for purposes to be explained hereinafter.

The suspension assembly 20 includes the upper cylinder member 46, the lower end of which telescopes into a base cylinder member 58. In addition, the suspension assembly 20 includes a torsion spring 60, one end of which is wound about a pin 62 that is fastened to and extends between disk members 64, 65 and 66. The other end of the spring 60 is wedged in a pivot pin 68 that is rotatably supported by the side walls 72 of a box frame welded to the angle irons 44. Each end of the pivot pin 68 is rigidly connected with a lever 74 that extends forwardly for pivotal connection with a link 76. The link, in turn, is pivotally mounted on the side of the base cylinder member 58 at a point 78. As seen in FIGURE 2 and as should be apparent, both sides of the seat assembly are provided with a similar lever and link arrangement, as described above. Thus, the seat 12, together with the upper cylinder member 46, is adapted to oscillate relative to the base cylinder member 58 during which time the torsion spring 60, acting through the levers 74, resiliently supports the seat.

For purposes of adjusting the tension of the spring 60, a rotatable tension screw 80 is provided and supported by bearing blocks 82 and 84 on an end wall 86 of the box frame. A knob 88 is secured to the lower end of the tension screw 80 in a position which makes it readily accessible to the vehicle operator. In addition, a tension clevis 90 is threaded on the tension screw 80 and cooperates with a pin 92 secured to the disc members 65 and 66 so that the tension of the torsion spring can be adjusted by rotating the knob 88. Thus, the seat occupant is able to select the type of ride he desires in relationship to his weight and the irregularities of the terrain over which the vehicle is to be operated simply by adjusting the tension in spring 60.

As is customary in seat constructions of the above-described type a shock absorbing device 94 is included with the suspension system so as to prevent any severe rebound and bottoming of the cylinder member as it oscillates relative to the base cylinder member. In this instance, the shock absorbing device 94 is mounted in a vertical plane and has the cylinder portion 95 fixed to the base cylinder member 58 by a pin 96 while the rod portion 98 is fixed by a pair of nuts 100 to a bracket 102 rigid with the inner wall of the upper cylinder member 46. The free end of the rod portion 98 terminates with a push button 104 the top of which, through the adjustment of the nuts 100, is positioned a predetermined distance from an actuator arm 106 pivotally supported on the upper end of the upper cylinder member 46 for movement about a transverse axis 108. A rectangular plate 109 is rigidly secured to the base plate 24 and is adapted to contact the upper surface of the actuator arm 106 which, in turn, serves to depress the push button 104. Thus, it should be apparent that when the front end of the seat 12 pivots upwardly to the position shown in FIGURE 6, it moves out of contact with the actuator 106 and the push button 104 assumes it normal position. However, whenever a load is placed on the seat, the forward end of the latter moves downward and causes the push button 104 to be depressed for purposes to be explained.

Referring now to FIGURE 8, the cylinder portion 95 of the shock absorbing device 94 comprises a pair of spaced concentric shells 110 and 112 between which a fluid reservoir 114 is provided that communicates with a chamber 116 through check valves 118 and 120. The rod portion 98 comprises a pair of axially aligned and interconnected tubular members 122 and 124. The inner end of the tubular member 122 is fixed with a piston 126 having an orifice 128 which, through radially extending passages 130, connects the chamber 116 with a chamber 132. A washer shaped valve 134 is normally biased into the position shown by a spring 136 so as to restrict fluid flow through the orifice 128. A slidable plunger 138 is provided in the tubular members 122, 124 and is formed with a conical tip 140 at the lower end that is adapted to be moved between the full line position and that indicated by the phantom lines. To effect such movement, the push button 104 is provided, the lower end of which contacts the top of the plunger 138 and acts against the force of a coil spring 142. Thus, under the influence of the spring 142, the plunger 138 normally assumes the full line positon; however, when the push button 104 is depressed, the tip 140 moves into the orifice.

The operation of the shock-absorbing device 94 is quite conventional and it will be understood that as the piston 126 moves in the downward direction or into the cylinder portion 95, the fluid in the chamber 116 flows through the orifice 128 and the passages 130 into the upper chamber 132. On the other hand, as the shock absorbing device is expanded so that the piston 126 is moving in an upward direction relative to the cylinder portion 95, the fluid in chamber 132 flows via the passages 130 and orifice 128 into the chamber 116. In the latter instance, however, the valve 134 is opened by the fluid flow so that during expansion, the device has a speed rate greater than during contraction. As is conventional, the check valves 118 and 120 provided the makeup fluid from and also serve to exhaust fluid to the reservoir 114 depending upon the direction of movement of the piston rod so as to compensate for the volume differential between the head and rod end of the device. In addition, it should be noted that during either expansion or contraction movement of the shock absorbing device 94, the plunger 138 may be moved into the orifice, as alluded to above, so as to restrict fluid flow through the orifice. In other words, the plunger provides a means for modulating the fluid flow through the orifice to thereby increase the damping effect of the shock absorbing device in both directions of movement.

The operation of this seat assembly is as follows:

When unoccupied, the seat 12 assumes the position shown in FIGURE 6 during which time the coil springs 56 of the seat support assembly 18 raise the front end of the seat to disengage the actuator 106 from the push button 104 of the shock absorbing device 94. On the other hand, when occupied the front end of the seat 12 moves to the position of FIGURE 2 so as to depress the push button and increase the damping characteristics of the shock absorbing device 94, as explained above. Under normal conditions, the seat 12 maintains the relationship of FIGURE 2 with respect to the upper cylinder member 46 so that the push button 104 is depressed and the influence of the torsion spring 60 is resisted by the shock absorbing device 94 in the fully damped state. However, in instances where the vehicle is driven over very bumpy terrain, the oscillating movement of the seat 12 will frequently become very drastic. During such time the movement of the occupant's body often is out of phase with the movement of the seat. In other words, the occupant may be moving upwardly while the seat moves down and when the direction of movement of the two reverses, a violent jarring of the occupant occurs. With this invention, however, when such a condition arises, as soon as the vehicle operator becomes weightless in the seat the coil springs 56 of the seat support assembly 18 raise the front end of the seat 12 with respect to the cylinder member 46 so as to disengage the plate 109 from the actuator arm 106. As aforedescribed, this action permits the spring 142 in the shock abosrbing device 94 to move the plunger 138 upwardly to decrease the damping effect. When this happens, the torsion spring 60 is able to raise the seat at a faster rate and maintain the seat with the occupant to avoid a collision of the type described above. The extent of upward movement of the seat front with respect to the upper cylinder member 46, of course, is governed by the severity of the bumps encountered by the vehicle and it is conceivable that at various times a complete loss of contact between the control plate 109 and the actuator 106 does not occur. In other words, in some instances there may be a slight degree of relative movement between the two so that the push button 104 is permitted to rise a small amount only. In those instances, although the degree of damping effect of the shock absorbing device is decreased, this decrease is less than that which occurs when complete contact is lost between the plate and actuator, as in FIGURE 6. Accordingly, the fluid flow through the piston of the shock absorber is modulated in accordance with the severity of the bumps encountered so that the seat occupant realizes the most comfortable ride at all times.

Various changes and modifications can be made in the above-described vehicle seat construction without departing from the spirit of the invention. It should be understood that such changes and modifications are contemplated by the inventor and he does not wish to be limited by the scope of the appended claims.

What is claimed is:

1. In combination with a seat for a vehicle operator, a base, seat support means, a suspension assembly resiliently supporting said seat support means on said base for oscillating movement relative to the latter, means connecting said seat to said seat support means so that a portion of said seat is movable relative to the seat support means, said suspension assembly including a shock-absorbing device, depressible means extending into said shock-absorbing device for modulating the damping characteristics thereof, said depressible means being operatively associated with said seat whereby movement of the latter relative to the seat support means controls the damping effect of the shock-absorbing device during said oscillating movement of said support member.

2. In combination with a seat for a vehicle operator, a base, seat support means, a suspension assembly resiliently supporting said seat support means on said base for oscillating movement relative to the latter, means connecting said seat to said seat support means so that said seat is movable vertically relative to the seat support means, said suspension assembly including a shock-absorbing device having one end fixed to said base and the other end fixed relative to the seat support means, means incorporated with said shock-absorbing device for modulating the damping characteristics thereof, said last-mentioned means being operatively associated with said seat whereby movement of the latter relative to the seat support means controls the damping effect of the shock-absorbing device during said oscillating movement of said support member.

3. In combination with a seat for a vehicle operator, a base, seat support means, a suspension assembly resiliently supporting said seat support means on said base for oscillating movement relative to the latter, means connecting said seat to said seat support means so that a portion of said seat is movable relative to the seat support means between two vertically-spaced positions, said suspension assembly including a shock-absorbing device having one end fixed to said base and the other end fixed relative to the seat support means, depressible means extending into said shock-absorbing device for modulating the damping characteristics thereof, said depressible means being operatively associated with said seat whereby movement of the latter between said two positions controls the damping effect of the shock-absorbing device during said oscillating movement of said support member.

4. In combination with a seat, a base member, an upper member having one end thereof telescoping into said base member, a seat support assembly mounted on the other end of the upper member, said seat support assembly comprising means for pivotally supporting the rear of said seat on said upper member, means supporting the forward portion of said seat for movement relative to the upper member between two extreme positions, a suspension assembly resiliently supporting said seat support assembly on said base member for oscillating movement relative to the latter, said suspension assembly comprising a spring interconnected between said base and upper members, a shock-absorbing device interconnected between said base and upper members for damping said oscillating movement, said shock-absorbing device having means for modulating the damping effect thereof, said last-mentioned means including a push button which when depressed increases the damping effect of said shock-absorbing device and when released decreases said damping characteristics, said forward portion of said seat operatively associated with said push button for depressing the latter when the seat is in one of said two extreme positions and for releasing the push button when said forward portion of said seat moves to the other of said two extreme positions.

5. In combination with a seat, a base cylinder member, an upper cylinder member having one end thereof telescoping into said base cylinder member, a seat support assembly mounted on the other end of the upper cylinder member, said seat support assembly comprising means for pivotally supporting the rear of said seat, means supporting the forward portion of said seat for movement relative to the upper cylinder member between two extreme positions, a suspension assembly resiliently supporting said seat support assembly on said base cylinder member for oscillating movement relative to the latter, said suspension assembly comprising a torsion spring interconnected between said cylinder members, a shock-absorbing device interconnected between said cylinder members for damping said oscillating movement, said shock-absorbing device compressing means for modulating the damping effect thereof, said last-mentioned means including a push button which when depressed increases the damping effect of said shock-absorbing device and when released decreases said damping characteristics, an actuator pivotally supported on the upper cylinder member and operatively associated with said push button, said forward portion of said seat adapted to move said actuator into engagement with the push button to depress the latter when the seat is in one of said two extreme positions and adapted to release the push button when said forward portion of said seat moves to the other of said two extreme positions.

6. In combination with a seat, a base cylinder member, an upper cylinder member having one end thereof telescoping into said base cylinder member, a seat support assembly mounted on the other end of the upper cylinder member, said seat support assembly comprising a pair of angle irons fixed to the upper cylinder member and extending to the rear thereof, means pivotally connecting the rear of said seat to said angle irons, means supporting the forward portion of said seat on said angle irons for movement relative to the upper cylinder member between two vertically-spaced positions, a suspension assembly resiliently supporting said seat support assembly on said base cylinder member for oscillating movement relative to the latter, said suspension assembly comprising a spring interconnected between said cylinder members, a shock-absorbing device interconnected between said cylinder members for damping said oscillating movement, said shock-absorbing device having means for modulating the damping effect thereof, said last-mentioned means including a push button which when depressed increases the damping effect of said shock-absorbing device and when released decreases said damping characteristics, an actuator supported by the upper cylinder member and operatively associated with said push button, a plate fixed on said forward portion of said seat for moving said actuator into engagement with the push button to depress the latter when the seat is in one of said two extreme positions, said actuator adapted to release the push button when said forward portion of said seat moves to the other of said two extreme positions.

7. In combination with a vehicle floor, a seat, a base cylinder member fixed at one end to said vehicle floor, an upper cylinder member having one end thereof telescoping into said base cylinder member, a seat support assembly mounted on the other end of the upper cylinder member, said seat support assembly comprising a pair of horizontal angle irons fixed to the upper cylinder member and extending to the rear thereof, means pivotally connecting the rear of said seat to said angle irons, means supporting the forward portion of said seat on said angle irons for movement relative to the upper cylinder member between two vertically-spaced positions, a suspension assembly resiliently supporting said seat support assembly on said base cylinder member for oscillating movement relative to the latter, said suspension assembly comprising a torsion spring interconnected between said cylinder members, a shock-absorbing device interconnected between said cylinder members for damping said oscillating movement, said shock-absorbing device having means for modulating the damping effect thereof, said last-mentioned means including a push button which when depressed increases the damping effect of said shock-absorbing device and when released decreases said damping characteristics, an actuator pivotally supported on the upper cylinder member and operatively associated with said push button, a plate fixed on said forward portion of said seat for moving said actuator into engagement with the push button to depress the latter when the seat is in one of said two extreme positions, said actuator adapted to move out of engagement with the push button to release the latter when said forward portion of said seat moves to the other of said two extreme positions.

8. In combination with a seat for a vehicle operator, a base, a suspension assembly resiliently supporting said seat on said base for oscillating movement relative to the latter, said suspension assembly including a shock-absorbing device having means for modulating the damping characteristics thereof, and means operatively associated with said last-mentioned means for permitting the latter to decrease the damping of the shock-absorbing device whenever the vehicle operator becomes weightless in the seat during said oscillating movement.

References Cited by the Examiner

UNITED STATES PATENTS

| | | | |
|---|---|---|---|
| 2,587,121 | 2/52 | Deardorff et al. | 248—400 |
| 2,788,842 | 4/57 | Ohlenkamp | 248—400 |
| 2,825,427 | 3/58 | Steibel | 188—96.21 |
| 2,917,103 | 12/59 | Korn | 248—400 |
| 3,059,890 | 10/62 | Radke et al. | 248—399 |
| 3,061,260 | 10/62 | Simons et al. | 248—399 |
| 3,096,066 | 7/63 | Grant et al. | 248—399 |
| 3,109,621 | 11/63 | Simons et al. | 248—399 |

CLAUDE A. LE ROY, *Primary Examiner.*